E. MILTNER.
DIE FOR FORMING PLASTIC COMPOUND FERRULES OR RINGS.
APPLICATION FILED JULY 18, 1908.
927,421. Patented July 6, 1909.
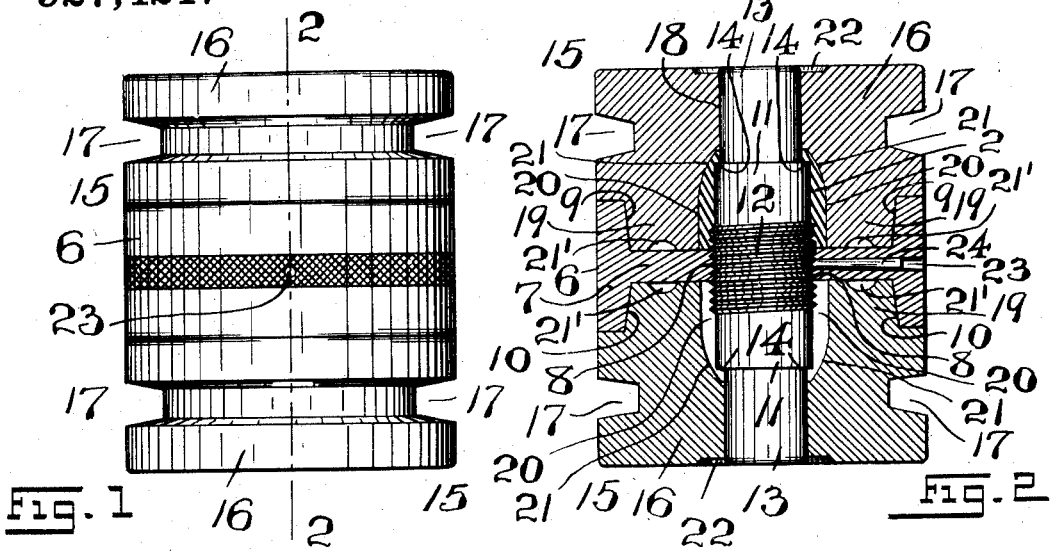
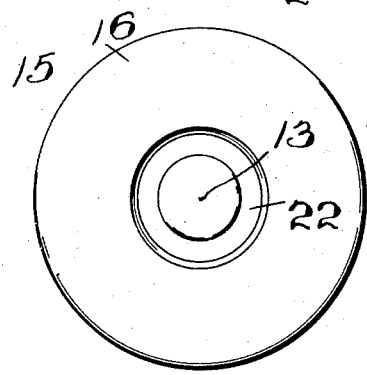
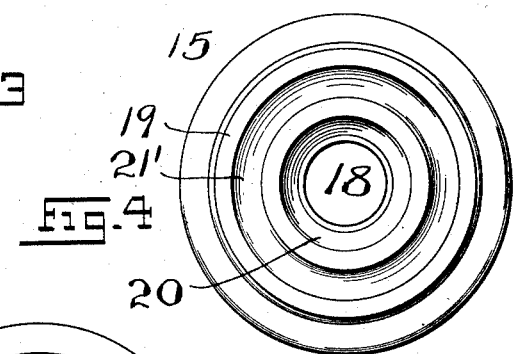
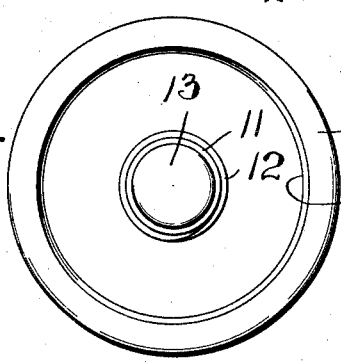
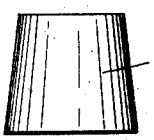
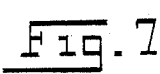
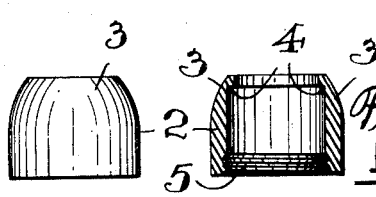
WITNESSES:
INVENTOR:
Ernest Miltner,
BY
Fraentzel and Richards,
ATTORNEYS

UNITED STATES PATENT OFFICE.

ERNEST MILTNER, OF NEWARK, NEW JERSEY, ASSIGNOR TO RUBBER & CELLULOID HARNESS TRIMMING CO., A CORPORATION OF NEW JERSEY.

DIE FOR FORMING PLASTIC-COMPOUND FERRULES OR RINGS.

No. 927,421.   Specification of Letters Patent.   Patented July 6, 1909.

Application filed July 18, 1908. Serial No. 444,253.

*To all whom it may concern:*

Be it known that I, ERNEST MILTNER, a citizen of the United States, residing at Newark, in the county of Essex and State of New Jersey, have invented certain new and useful Improvements in Dies for Forming Plastic-Compound Ferrules or Rings; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to a novel construction of die or dies for making and forming ferrules for shaving and other brushes, and rings or the like, which are made from celluloid, or other plastic compounds of a like character; and, the invention has reference, more particularly, to a novel construction of die which is employed in the manufacture of ferrules, or the like, made from a suitable plastic compound, as celluloid, the finished ferrule, when removed from the die, being complete in itself as to its general outer and inner contour and being removed from the male member of the die, as will hereinafter appear, provided with an internally disposed screw-threaded portion and an internally arranged annular shoulder, such as are essential to the celluloid or other plastic ferrules ordinarily employed in the manufacture of shaving brushes.

My present invention, therefore, has for its principal object to provide a simply constructed and easily operated die for the production of ferrules, rings, and similar articles of manufacture, and of the general character hereinafter more particularly specified.

With the various objects of my present invention in view, this invention consists, primarily, in the novel die of the general character hereinafter more particularly specified; for forming, making and pressing into shape, brush-ferrules, rings, and similar articles of manufacture made from a suitable plastic compound, such as celluloid or the like.

The invention is clearly illustrated in the accompanying drawings, in which:—

Figure 1 is a side elevation of one form of die embodying the principles of the present invention; and Fig. 2 is a transverse vertical section of the same, said view showing more particularly the general arrangement of the male die-member provided with oppositely extending stems, over each of which is movably fitted a female die-member, so that a piece of tubular plastic compound which is placed within a space between the male and female die-members is suitably formed into the finished article desired, when the female member is forced under pressure over the stem of the male member of the die. Fig. 3 is a plan view of the assembled members of the die; Fig. 4 is a bottom view of the female member of the die; and Fig. 5 is a plan view of the male member of the die. Fig. 6 is a side view, and Fig. 7 a transverse vertical section of a piece of plastic tubing, showing its general shape prior to being placed between the male and female members or portions of the die. Fig. 8 is a side view, and Fig. 9 a transverse vertical section of said piece of plastic tubing in the form of a finished brush-ferrule, as it comes from the die upon the separation of the said male and female members of the die.

Similar characters of reference are employed in all of the above described views, to indicate corresponding parts.

In the present instance, I have shown my invention in its application to the making of brush-ferrules from a plastic compound, as celluloid or the like; but it will be evident that while I prefer to produce a die-construction for the purpose of making and pressing into shape brush-ferrules of the general construction herein shown and more fully described in the following specification, still it will be understood, that I intend to use my novel form of die for making rings, generally, and similar articles of manufacture made from a plastic compound and adapted to be pressed into shape in the manner to be presently more fully described.

In the manufacture of plastic ferrules, as 2, see Figs. 8 and 9 of the drawings, for shaving and other brushes, such ferrules are provided with a rounded or tapering end-portion 3, substantially as indicated, and with an inner annular shoulder or off-set, as 4, and an internally screw-threaded portion 5, all of which parts are to be pressed into form, so that the finished product is removed from the die, as will be presently described. The die consists, essentially, of a male body or member 6 which is provided with a central web 7 formed with a centrally disposed and internally screw-threaded hole 8. The main construction of the said male body or member is such that suitable receiving recesses 9 and 10 will be formed upon the opposite sides of said web 7, as shown in Fig. 2 of the drawings, and for the purposes to be presently more fully set forth. Suitably screwed into said screw-threaded hole 8 is an externally screw-threaded portion or body 12 of a suitable stem, said stem extending on opposite sides of the said web 7, being formed with the stem portions 11 and the reduced end-portions 13, so as to provide an annular shoulder or off-set 14 upon each side of the web 7, substantially in the manner illustrated in said Fig. 2 of the drawings.

The reference-character 15 indicates a pair of female die-members, each member 15 comprising a main body 16 and an annular groove or depression, as 17, formed in the external surface of the said main body. Each female member is provided in its main body 16 with a receiving hole 18 of the proper shape to receive the end-portion 13 of the stem of the male member of the die. The female members are also each provided with reduced portions or parts 19, forming part of each body 16, and are adapted to be fitted into and register with the receiving recesses 9 and 10 of the male die-members, as clearly shown. Each female die-member is also made with an enlarged open or socketed portion 20, which is inwardly curved or tapered, as at 21. When the receiving hole 18 of each female die-member is slipped over the end-portion 13 of the stem of each male member, each annular shoulder or off-set 14 and each stem-portion 11 will be arranged within the enlarged open or socket portion 20 of a female die-member. The reduced portion or part 19 of each female die-member may also be provided with an annular groove or depression 21', the outer ends of the female members being also preferably suitably depressed or dished out, as at 22. To retain the stem of the male die-member in position, against accidental displacement due to jarring or otherwise, the web 7 is made with a hole 23 for the reception of a fastening pin 24, the free end of which is driven into the stem of the male die-member.

Having thus described the general arrangement and construction of the various members comprising my novel form of die, I will now set forth the method of using the same in pressing out of tubing, made of any suitable plastic material, brush ferrules, rings, or similar articles. As shown, while the die comprises but one male die-member, I prefer to employ two female members in connection therewith, thus enabling the making of two ferrules or rings at one and the same time. I first take a piece of celluloid or similar tubing and cut the same into smaller tubular pieces. These tubular pieces I drive upon a tapered mandrel, or the like, so as to provide conically formed pieces 25 of the general configuration shown in Figs. 6 and 7 of the drawings. I now arrange upon each stem-portion of the male die-member one of these conical pieces 25, then over each conical piece 25 and each end-portion 13 of the stem of the male die-member I place a female die-member. Any suitable number of such assembled die-members, with the conical pieces 25 placed therebetween, are then arranged between the usual steam-tables or platens of a power-press. The heat from the steam is sufficient to soften the plastic-compound pieces 25, so that, when the platens are brought down upon the assembled die-members, the latter will be closely brought together, with the pieces 25 easily compressed and shaped into the desired form, as will be clearly evident from an inspection of Fig. 2 of the drawings. After this the dies are removed from the press and allowed to cool. To separate the female die-members from the male die-member, the upper female member is supported between the arms of a yoke or fork of an ordinary foot or other press, by having said arms arranged in the annular groove or depression 17 of the upper female die-member, a plunger of the foot-press being brought down upon the end of the upper end-portion 13 of the stem, whereby the male die-member, with the pressed ferrule or ring still mounted upon the stem, are removed from the upper female die, the lower female die-member still clinging to the male die-member, as will be evident. The finished ferrule is then removed by unscrewing it from the freed stem-portion, and any rough edges cleaned off and then polished for use. The male die-member and lower female die-member are now brought into their reversed position, and the female die-member supported between the arms of the yoke or fork of the foot-press, and the male die-member separated from the female die-member in the manner previously stated. The pressed ferrule is then removed from the stem portion, as above stated.

From the foregoing description of my present invention it will be clearly evident that I have produced a simply constructed die for quickly pressing up ferrules or rings made from plastic material, the ferrules being formed with an internally screw-threaded part, and with an inner annular shoulder or off-set, and at the same time a seamless ferrule or ring is produced.

The previously mentioned annular grooves or depressions 21' are for the purpose of receiving any part of the plastic material not taken up by the chambered or hollow portions of the die-members, as will be clearly evident.

I claim:

1. A die for forming ferrules, rings, and the like from plastic-compound tubing, comprising a male member having a web formed with a screw-threaded hole, a stem formed with a screw-threaded body screwed into said hole in the web, said body of the stem being provided with annular shoulders and reduced end-portions, said screw-threaded body being screwed into the hole in the web, so that the reduced end-portions of the stem, the annular shoulders, and portions of the screw-threaded body will project from the opposite faces of said web, and a pair of female members, each female member being provided with a receiving hole so as to be each arranged upon an end-portion of said stem, and each female member being also provided with an enlarged and inwardly curved socketed portion, substantially as and for the purposes set forth.

2. A die for forming ferrules, rings, and the like from plastic-compound tubing, comprising a male member having a web formed with a screw-threaded hole; and said web being provided upon each face with an annular shoulder so as to produce a receiving recess upon each side of the web, a stem formed with a screw-threaded body screwed into said hole in the web, so that the end-portions of the stem and portions of the screw-threaded body will project from the faces of said web, and a pair of female members, each female member being provided with a receiving hole so as to be each arranged upon an end-portion of said stem, and each female-member being also provided with an enlarged and inwardly curved socketed portion, substantially as and for the purposes set forth.

3. A die for forming ferrules, rings, and the like from plastic-compound tubing, comprising a male member having a web formed with a screw-threaded hole, and said web being provided upon each face with an annular shoulder so as to produce a receiving recess upon each side of the web, a stem formed with a screw-threaded body screwed into said hole in the web, said body of the stem being provided with annular shoulders and reduced end-portions, said screw-threaded body being screwed into the hole in the web, so that the reduced end-portions of the screw-threaded body will project from the opposite faces of said web, and a pair of female members, each female member being provided with a receiving hole so as to be each arranged upon an end-portion of said stem, and each female member being also provided with an enlarged and inwardly curved socketed portion, substantially as and for the purposes set forth.

In testimony, that I claim the invention set forth above I have hereunto set my hand this 17th day of July, 1908.

ERNEST MILTNER.

Witnesses:
FREDK. C. FRAENTZEL,
ANNA H. ALTER.